US006704377B1

(12) United States Patent
Hsuan

(10) Patent No.: US 6,704,377 B1
(45) Date of Patent: Mar. 9, 2004

(54) METHOD OF CORRECTING FREQUENCY ERRORS FOR COHERENTLY DEMODULATED WIRELESS COMMUNICATION SYSTEMS

(75) Inventor: Yi Hsuan, Whippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/522,706

(22) Filed: Mar. 10, 2000

(51) Int. Cl.$^7$ .............................................. H04L 25/08
(52) U.S. Cl. ........................ 375/346; 375/362; 375/375; 375/355
(58) Field of Search ................................. 375/325, 326, 375/327, 339, 344, 345, 348, 362, 371, 373, 375, 376; 348/735, 726, 725; 455/182.1, 182.2, 192.2, 192.3, 164.1, 164.2, 165.1; 370/509–512, 513–516, 520

(56) References Cited

U.S. PATENT DOCUMENTS

| 4,005,266 A | * | 1/1977 | Lehr et al. ................... 375/356 |
| 5,459,435 A | * | 10/1995 | Taki ........................... 331/1 A |
| 5,524,026 A | * | 6/1996 | Murata ........................ 375/329 |
| 5,625,652 A | * | 4/1997 | Petranovich ................. 375/355 |
| 5,793,821 A | * | 8/1998 | Norrell et al. ............... 375/355 |
| 5,929,670 A | * | 7/1999 | Yamashita ................... 327/116 |
| 5,933,059 A | * | 8/1999 | Asokan ........................ 331/18 |
| 5,959,682 A | * | 9/1999 | Kim et al. ................... 348/511 |
| 6,115,417 A | * | 9/2000 | Matsunaga et al. ......... 375/226 |
| 6,137,847 A | * | 10/2000 | Stott et al. ................... 375/344 |
| 6,320,915 B1 | * | 11/2001 | Stott et al. ................... 375/340 |
| 6,490,010 B1 | * | 12/2002 | Shibuya et al. ............. 348/735 |

* cited by examiner

Primary Examiner—Khai Tran
Assistant Examiner—Khanh Cong Tran

(57) ABSTRACT

The present invention provides a receiver for correcting frequency errors in a receiver of a coherently demodulated communication system, whereby two simultaneous counts are performed for a plurality of symbol comprising an incoming packet of information. In particular, a first count is performed where a counter increases or decreases based on the comparison of symbol phases from outputs of two components of the receiver. Simultaneously, a second counter increments sequentially for each symbol processed. A frequency increment or correction is applied when the first counter reaches a threshold, resetting the first and second counters for subsequent symbols. The receiver may reduce frequency offset estimation errors which degrade channel performance, as compared to algorithms currently utilized to correct frequency errors in wireless communications networks and/or systems. Moreover, a significant improvement in packet error rate may be attainable in accordance with the aforementioned receiver.

20 Claims, 6 Drawing Sheets

METHOD OF CORRECTING FREQUENCY ERRORS FOR COHERENTLY DEMODULATED WIRELESS COMMUNICATION SYSTEMS

BACKGROUND OF THE INVENTION

1. Field of the Invention

The present invention relates to the field of wireless communications, more particularly to correcting frequency errors in coherently demodulated wireless communication systems.

2. Description Of The Related Art

Explosive growth in the market for internet and intranet related applications has provided the impetus for a greater demand for fixed wireless networking services and systems. A wireless internet access system (WIAS) illustrated in FIG. 1 is composed of four major parts: (a) multiple data base stations (BS) 100(a) and 100(b) which provide wireless connectivity and gain coverage to subscriber units 102(a)–(d) of a large geographical area (for example, residential and corporate terminal equipment as illustrated in FIG. 1); (b) wireless modems 170(a)–(c) (hereinafter "WM") which are connected to BS 100(a) or 100(b) via wireless links 115(a)–(c); (c) a data switching center (DSC) 125 with integrated management functions; and (d) a backbone transmission network 135 interconnecting (a)–(c) above.

As can be seen from FIG. 1, corporate terminals 102(c) and 102(d) can be, and many times are, connected to WM 170(c) via a local area network (LAN) and a wireless router or firewall (not shown). Additionally, BS 100(a) and 100(b) may communicate with DSC 125 via frame relays (not shown). Further in conventional wireless internet access systems or networks, DSC 125 is interconnected with backbone transmission network 135 by a router and/or firewall (not shown for clarity).

FIG. 2 illustrates BS 100(a) and 100(b) of FIG. 1 in an operational mode. Each BS 100(a) and 100(b) provides 360° RF coverage on the order of several gigahertz (preferably operating in the 3.5 GHz spectrum using approximately 5 MHz wide channels), sending and receiving signals over air lines 115(a)–(c) between individual subscriber units 102(a)–(d) served by BS 100(a) and/or 102(b). More particularly, the designated geographical area of subscribers served by each BS 100(a) and 100(b) is typically called a cell 150, defined by its coverage area as shown in FIG. 2, where BS 100(a) and 100(b) are situated in designated cells 150(a) and 150(b). Within each cell 150(a) or 150(b) reside a plurality of subscribers 102(a)–(d) served by the BS 100(a) and/or 100(b) includes a plurality of access points (hereinafter "AP", not shown in FIG. 1) serving as an interface between individual subscribers 102(a)–(d) of a cell 150(a)–(b) served by BS 100(a)–(b). Each access point includes receiver and transmitter circuitry of the base station for communicating with individual subscribers 102(a)–(d) within a designated cell 150(a)–(b).

A channel is the wireless link between an AP antenna and a WM antenna. There are a plurality of channels for receiving packets of information transmitted along various frequency bands, be it from an AP transmitter to WM receiver or vice versa. In either case, the WM and/or AP receiver can function in only one frequency band, and hence in only one channel, at a time. Further within the receiver circuitry of an AP and/or WM, there are several components used for synchronizing the time and frequency of an incoming packet with the receiver circuitry, so as to provide acceptable receiver performance.

As will be explained in more detail below, a synchronization as well as an equalization process is performed in the receiver for each incoming packet of information received by the receiver. Based on the synchronization process, a frequency offset estimation is calculated to account for the frequency offset which develops within the receiver during processing of the packet. As explained in co-pending U.S. patent application Ser. No. 09/XXX,XXX, entitled "FREQUENCY AND TIME SYNCHRONIZATION IN SEVERE DELAY SPREAD CHANNELS" and filed concurrently with the present application, a frequency offset exists because oscillators in both the transmitter and the receiver have different frequencies, although desirably they should have the same frequency. Accordingly, a frequency offset correction (hereinafter termed a stage 1 frequency offset correction algorithm) is performed in the synchronizer, and a frequency offset estimate (or phase drift (pd), as described in co-pending application 09/XXX,XXX) is generated by the synchronizer.

However this estimate is not perfectly accurate, i.e., there is some difference between the frequency offset and the frequency offset estimate (phase drift). This difference is termed a frequency offset estimate error, and should be corrected by application of a second correction, or a stage 2 frequency offset correction algorithm. Specifically, the frequency offset estimation errors affect the packet error rate (PER) performance, or probability that a transmitted packet cannot be received correctly by the receiver. For example, if the frequency offset estimate error causes a 1 degree per symbol phase drift, then after 180 symbols are processed by a receiver, all the symbol phases will be about 180 degrees off of the correct phases. This phase inaccuracy causes inaccurate and/or erroneous demodulation results, and thus packet errors.

To help understand the current implementation used for determining frequency offset estimation for channels in a wireless network and/or system, the following terms are defined. Each detected packet is divided into symbol segments allocated to various components within the receiver. For example, time symbol sequences can be allocated to a Barker detection unit, synchronizer and equalizer of a receiver. Typically each incoming packet includes in upwards of 2,000 time symbols that are processed in the various components of the receiver.

As previously discussed, to correct the frequency offset, the current implementation utilizes two frequency correction algorithms, a stage 1 frequency offset estimation algorithm and a stage 2 frequency correction algorithm. The function of the stage 1 frequency offset correction algorithm is to determine an initial frequency offset estimate (i.e., coarse frequency adjustment) for each incoming packet of information. The function of the stage 2 frequency correction algorithm is to compensate for any frequency error resulting from the stage 1 algorithm's determination.

FIG. 3 illustrates components comprising part of a receiver typically used in a WM and/or AP of a wireless system. The current stage 1 and stage 2 frequency correction algorithms are explained with reference to FIG. 3, and depicts a part of a receiver 200 comprising a frequency synchronizing unit 215, frequency correction unit (FCU) 230, equalizer 235, adaptive frequency offset correction (AFOC) unit 240 and decision device 245.

In FIG. 3, each incoming packet is processed in Barker detection circuitry (informing the receiver of an incoming packet), and the received signal is subject to frequency synchronization in a frequency synchronizing unit 215. Any frequency offset developed between an oscillator of the receiver 200 (not shown) and the oscillator of the transmitter (AP) for example, can cause a constant phase drift between two time symbols. To account for this drift, frequency correction unit 230 receives inputs from frequency synchronizing unit 215 and an adaptive frequency offset correction unit (AFOC) 240 to determine a per-symbol phase drift. For example, frequency synchronizing unit 215 outputs an initial pd calculation which is then modified by an output from AFOC 240 for each sequentially received symbol of the packet.

Equalizer 235 processes the output of FCU 230 on a per-symbol basis to remove the effects of inter-symbol interference introduced by the channel. The output of equalizer 235, a complex number representing a symbol of the incoming packet, is fed to decision device 245. Decision device 245 maps this complex number to the closest QPSK symbol on the complex number plane, and outputs the result for subsequent decoding and/or demodulation in downstream circuitry to convert the complex symbols to ones and zeros for digital processing within the WM and/or AP.

The current stage 1 frequency correction algorithm estimates frequency offset frequency synchronizing unit 215. The stage 1 algorithm is performed within frequency synchronizing unit 215 and the stage 2 algorithm in AFOC unit 240. Frequency correction unit 230 rotates symbols in a complex plane based on inputs from both frequency synchronizing unit 215 and AFOC unit 240, to calculate phase drift. Specifically, FCU 230 rotates symbols based on pd.

However, due to the error of the stage 1 frequency estimate, some performance degradation is present, e.g., nearly 3 dB degradation for a channel 1, for example. The channel 1 model is a channel where there is only one propagation path between the transmitter and the receiver. The channel 1 model does not have any delay spread and is the most desirable channel conditions. This model is used for simulations to approximate the performance of typical channels, which are generally more likely to exhibit channel 1 model characteristics than other channel models exhibiting delay spread.

As discussed above, the stage 2 frequency correction algorithm is designed to compensate for the frequency error resulting from the stage 1 computations. The current stage 2 algorithm is effective in correcting frequency errors up to about 0.6 degree per symbol without substantial degradation. The stage 2 algorithm has two parameters: a frequency increment (FI) amount and a counter threshold (CT), which equal to 0.05°/symbol and 4 respectively from current simulations used to perfect the algorithm. As noted above, the stage 2 algorithm is performed in AFOC unit 240. AFOC unit 240 compares the phase of a symbol output from equalizer 235 and the phase of the same symbol output from decision device 245. If the phase of 235 output is larger than that of 245 output, CT is decremented (decreased). Otherwise, CT is incremented [increased] for each symbol, up to a counter threshold of ±4. More particularly, this frequency correction is applied when the absolute value of the counter reaches 4, whereupon CT is then reset to zero again. Once CT=±4, a fixed amount of frequency correction (±0.05). For example, if CT=4, +0.05 is applied; if CT=−4, −0.05 is applied to the frequency estimate determined by the stage 1 algorithm in frequency synchronizing unit 215.

To illustrate this, consider x as the phase of a symbol output from equalizer 235, and y to be the phase of the same symbol, but output of decision device 245. If x<y, the counter CT increments (increases by +1). However, if x>y, the counter decrements by −1. The values x and y are actually complex numbers which represent the phases. Thus, if the counter reaches |±4|, FCU 230 alters the per symbol phase drift amount PD by ±0.05° for that symbol. For example, if CT=+4 at the threshold, this means that the phases of the equalizer 235 x outputs are generally smaller (lagging) the phases of the HDD 245 y outputs. Since x and y are complex numbers, the process of increasing the phase of a complex number can be visually analogous to rotating a complex number (of the phase) counterclockwise on a complex plane. Likewise, decreasing the phase of a complex number is like rotating it clockwise.

Accordingly, when CT=+4 in this example, what is desired is to add more degrees to the phase of the equalizer 235 inputs, so as to increase the per-symbol phase drift amount stored in FCU 230 by +0.050. Conversely, if the counter value CT reaches −4, the phases of the equalizer inputs need to be reduced, so as to decrease the per symbol phase drift (pd) by −0.05°.

Although the current stage 2 algorithm is effective in correcting frequency errors up to 0.6 degree per symbol, the performance degradation for the channel 1 model (in this example) becomes much more obvious when the frequency offset correction required is greater than 0.8° per symbol, i.e., signifying large frequency errors. Further, since channel 1 operates at a lower signal-to-noise ratio (Es/No=15 dB) than some of the other channels in the wireless communication system, the estimated root means square (RMS) of the frequency error for channel 1 is typically greater than 0.6° per symbol. This means that there is a large performance loss (in terms of PER) for channel 1 due to frequency offset estimate errors. This is because the current stage 2 algorithm is ineffective in correcting these much larger frequency errors, which results in nearly 3 dB degradation due to the inaccuracy of the stage 1 frequency estimate. Accordingly, what is needed is a method which improves the frequency correction performance of the stage 2 algorithm, thereby combating the larger frequency errors while still maintaining the ability to handle and process small frequency errors.

SUMMARY OF THE INVENTION

The present invention provides a method for correcting frequency errors in a receiver of a coherent demodulated wireless communication system. The method comprises performing a first count for a plurality of sequential symbols of a transmitted packet up to a threshold; performing a second count for said plurality of symbols; and applying a frequency correction which is a function of said first and second counts. Additionally, the method adjusts the size of the frequency correction applied to the receiver to combat frequency errors which are generally larger at the beginning of an incoming packet, and which decrease for the remainder of the symbols of the packet processed in the receiver.

BRIEF DESCRIPTION OF THE DRAWINGS

The present invention will become more fully understood from the detailed description given hereinbelow and the accompanying drawings, wherein like elements are represented by like reference numerals, which are given by way of illustration only and thus are not limitative of the present invention and wherein.

DETAILED DESCRIPTION

The present invention provides a method for correcting frequency errors in a receiver of a wireless communication network and/or system, whereby two simultaneous counts are performed for each symbol of an incoming packet of information. In the method, a first count is performed by a first counter, which increases or decreases based on a comparison of phases from the outputs of two components of the receiver. Simultaneously, a second counter increments sequentially for each symbol processed.

A frequency increment FI (i.e., frequency correction), is applied when the first counter reaches a threshold, resetting the first and second counters for subsequent symbols. The method may reduce the frequency offset estimation errors as compared to the current methods utilized to correct frequency errors in receivers of coherent demodulated wireless communication systems. Moreover, a significant improvement in packet error rate performance may be attained in accordance with the method of the present application.

Coherent demodulation, in short, requires that a demodulator use the exact phase of each symbol to make a decision on what is being transmitted at the receiver. As opposed to coherent demodulation, non-coherent demodulation does not require the symbol phase in its decision process. Because coherent demodulation decisions are made based on incoming symbol phases, the accuracy of phase or frequency estimation at the receiver is critical.

Both a wireless modem (WM) and an access point (AP) within a wireless communication system in accordance with the present application have radio units with receiver and transmitter circuitry, each providing for respective transmit and receive functions. An uplink signal transmitted from WM to AP can operate in a 1 MHz RF channel between approximately 3450–3500 MHz, whereas a downlink signal transmitted from AP to WM preferably occupies a 1 MHz RF channel between approximately 3550–3600 MHz. Further, both radio units have an automatic gain control (AGC) function to provide linear demodulation over a wide dynamic range; a receive signal strength indication (RSSI) function to enable digital control of the AGC; and both radio units perform quadrature phase shift keying (QPSK) modulation and demodulation, as well as quadrature amplitude modulation (QAM).

Figure 1:
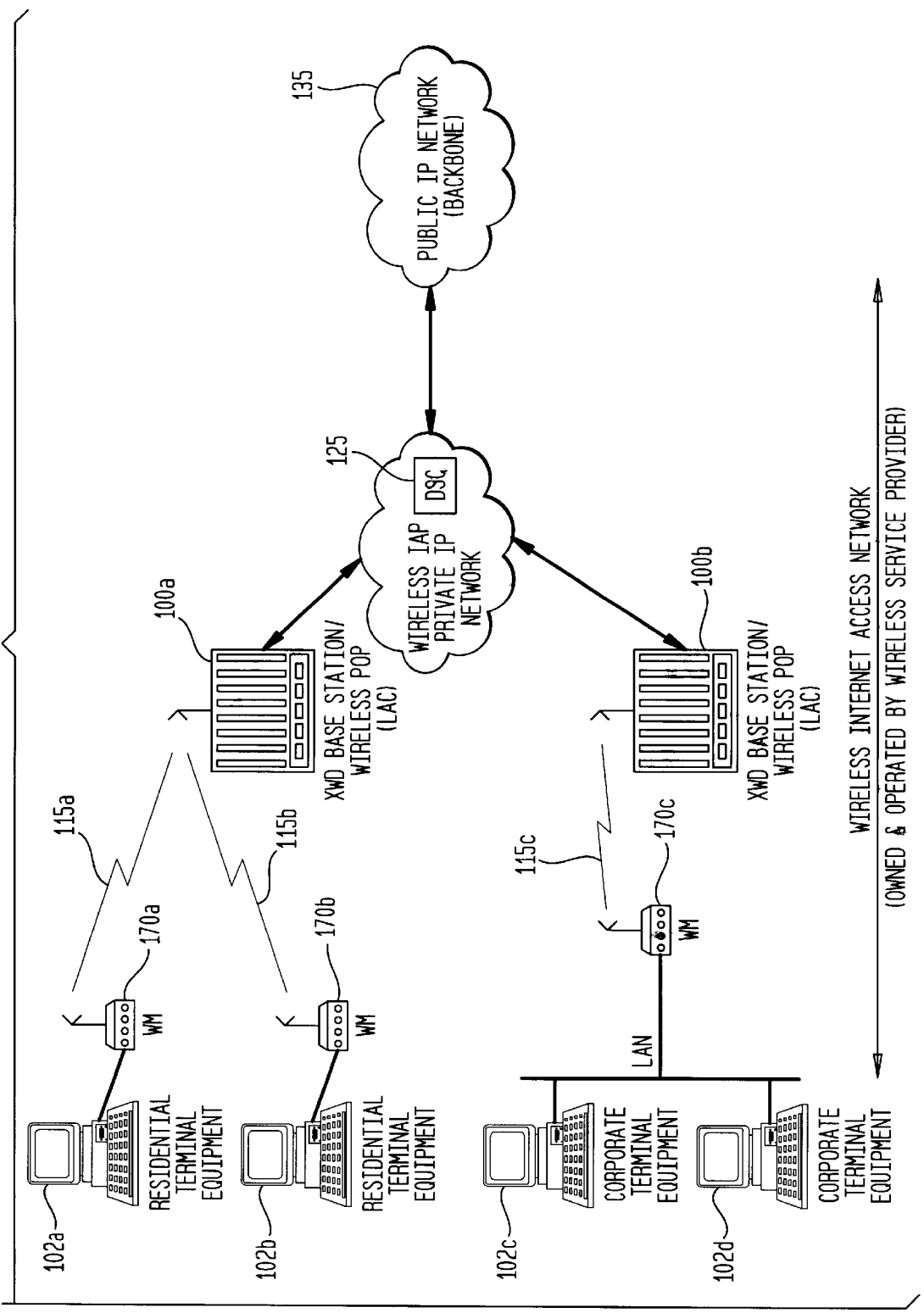
FIG. 1 illustrates a wireless internet access system in accordance with the preferred embodiment.
Figure 2:
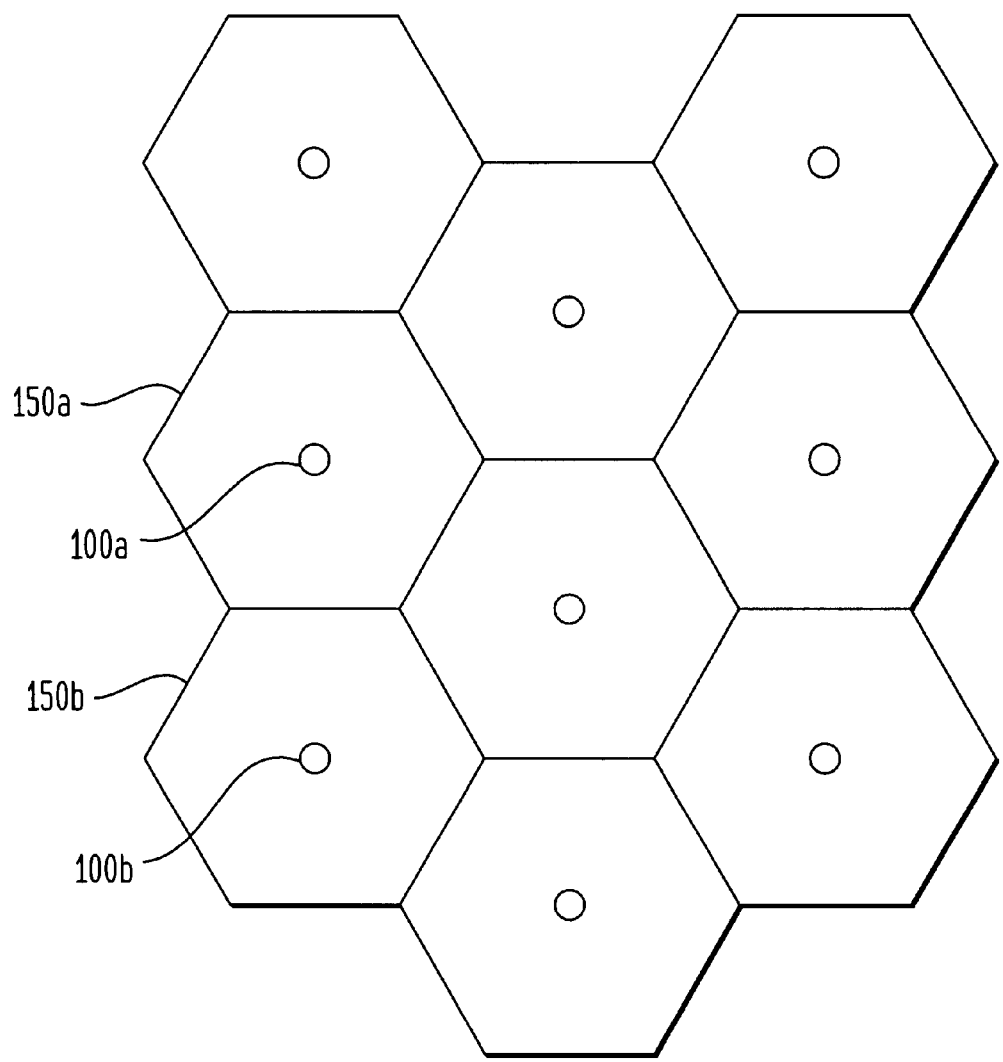
FIG. 2 illustrates the base stations of FIG. 1 in an operational mode.
Figure 3:
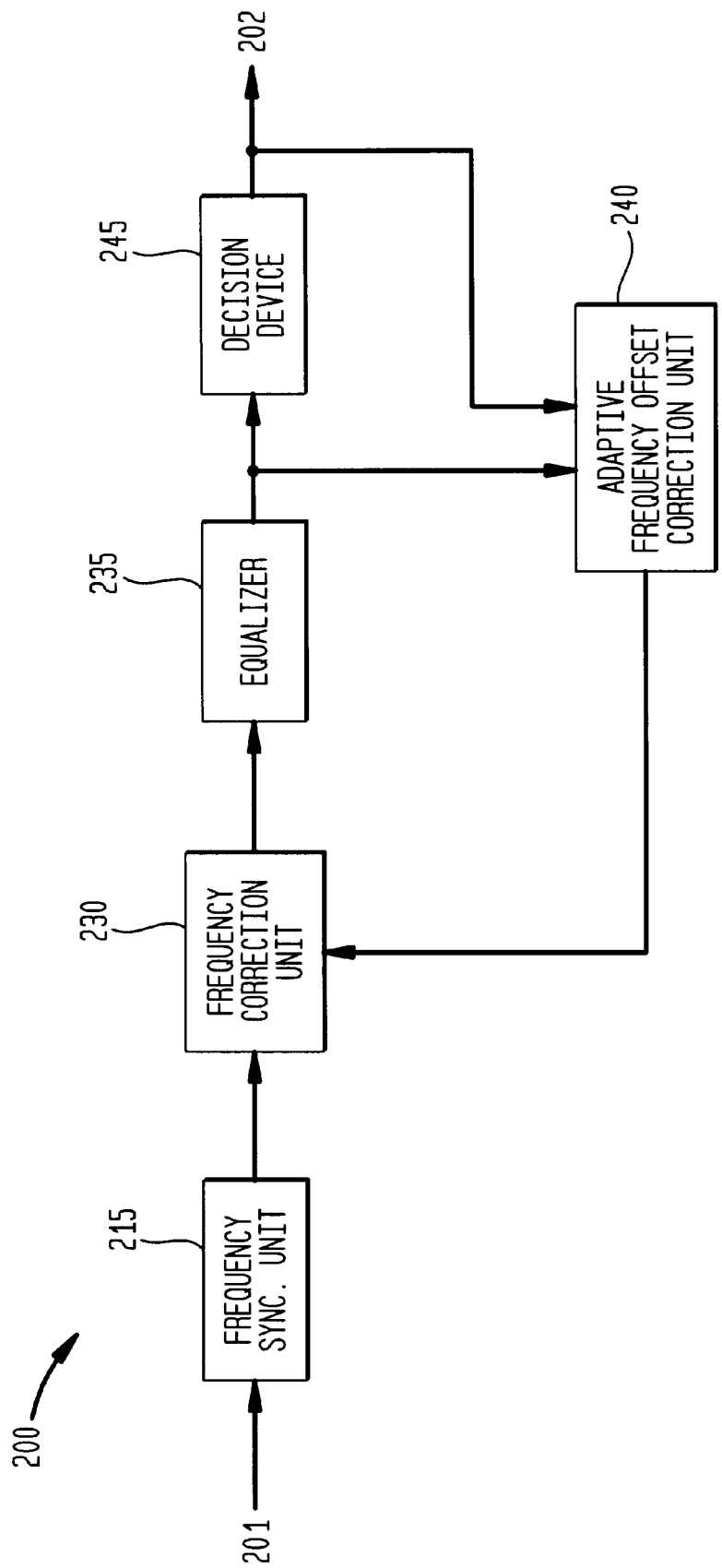
FIG. 3 illustrates a block diagram of part of a receiver in a wireless communication system.
Figure 4:
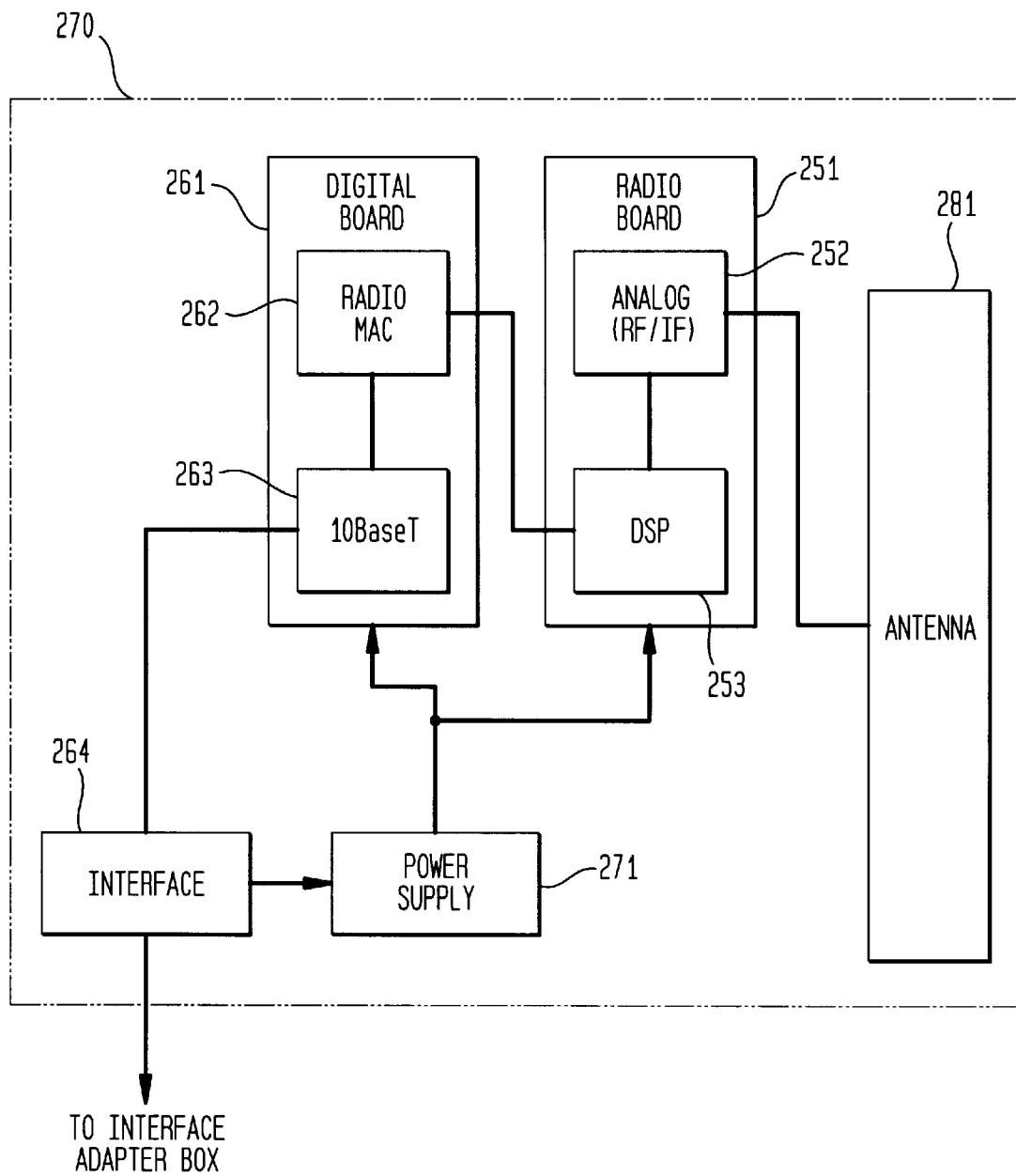
FIG. 4 depicts a wireless modem block diagram in accordance with the present application.

FIG. 4 depicts a block diagram of the architecture of a WM 270 in accordance with the preferred embodiment. Radio board 251 converts RF signals received from an AP via a WM antenna 281 to digital signals, and vice-versa. WM antenna 281 can be a vertically polarized, 16 element (4×4) raised patch slot fed array designed to operate at a center frequency of 3.5 GHz, which provides for approximately 18 dBi of gain with a 3 dB beamwidth at approximately 18° in the azimuth and elevation planes respectively. The received RF signals are downconverted to baseband I/Q signals through a two-stage heterodyne conversion at 252. Digital Signal Processor (DSP) 253 performs the QPSK modulation/demodulation of the baseband I/Q signals, which are further processed at a digital board 261.

Digital board 261 provides medium access control (MAC) and protocol functions at 262 to ensure that only a single WM is communicating with an AP at any given time through scheduling of data transmission and traffic management. Digital board 261 also performs conversion of a proprietary MAC data format to standard 10Base-T data streams at 263 for connection to subscriber end user 290 (not shown) via interface 264. Power supply 271 preferably supplies WM 270 with 24 V DC, and preferably supplies 7 VDC to power radio board 251 and digital board 261.

Figure 5:
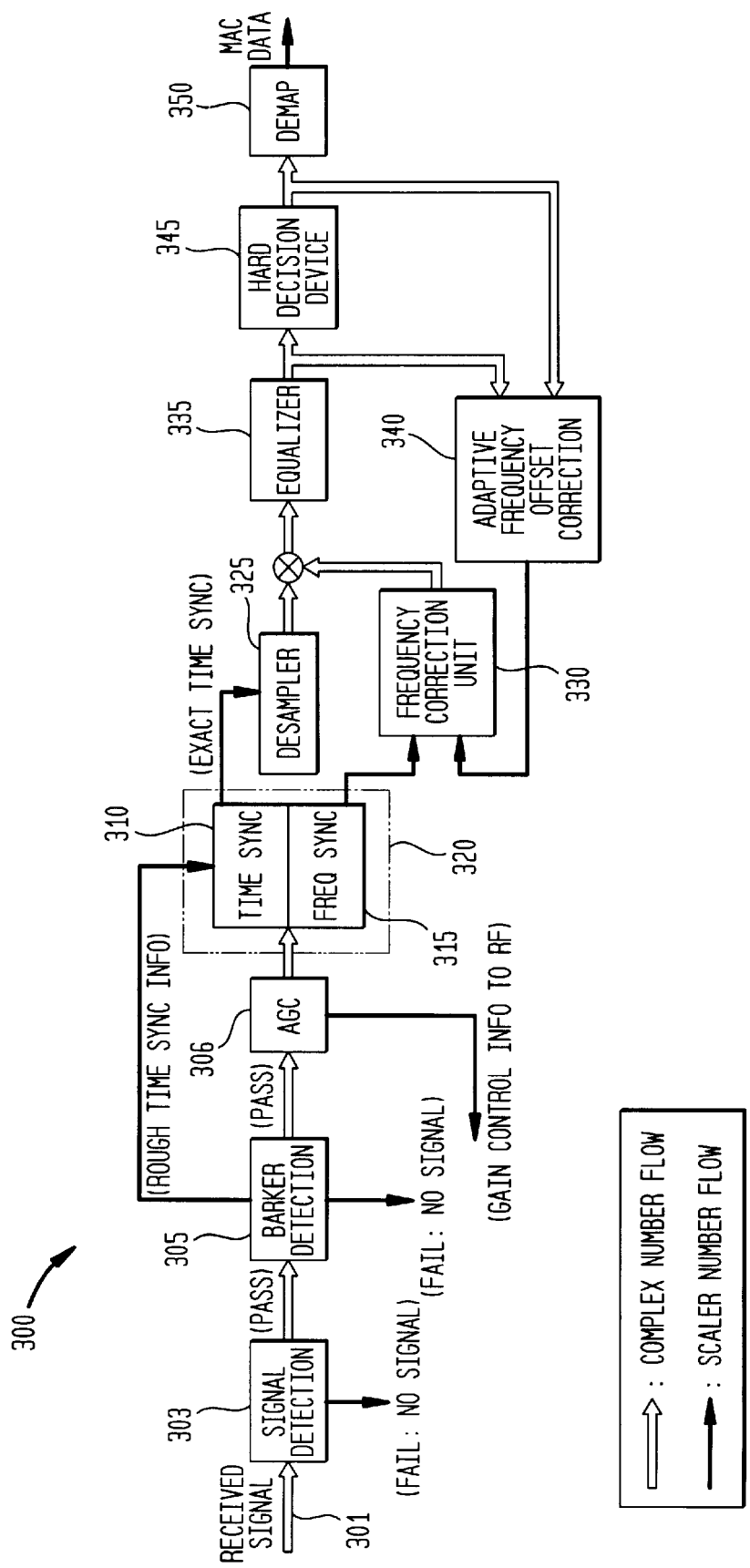
FIG. 5 depicts receiver circuitry block diagram for a wireless modem in accordance with the present application.

FIG. 5 illustrates a block diagram of a receiver for a wireless modem in accordance with the present application. Specifically, there is illustrated a receiver 300 of WM 270, which is located in the DSP 253 of the radio board of the WM 270 block diagram of FIG. 4, for example. Receiver 300 comprises a signal detection unit 303, a Barker detection circuit 305, an automatic gain control circuit (AGC) 306, a synchronizer 320, a desampler 325, a frequency correction unit (FCU) 330, an equalizer 340, an adaptive frequency offset correction unit (AFOC) 335, a hard decision device (HDD) 345 and a DEMAP unit 350. Additionally, synchronizer 320 is further comprised of a time synchronization portion 310 and a frequency synchronization portion 315.

Referring to FIG. 5, after received signals 301 pass through antenna 281, and undergo 2-stage heterodyne conversion at analog converter 252 (not shown in FIG. 5 for clarity), the received signals 301 are initially over-sampled to eight (8) samples per symbol. Signal detection unit 303 performs a pass/fail (ON/OFF) test to determine that a received signal, which is illustrated as a complex number flow, is indeed present. If so, it passes the complex number representing the signal to Barker detection unit 305; otherwise signal detection unit 303 informs receiver 300 that no signal is present, which ceases any further processing in receiver 300.

Barker detection circuit 305 functions as a signal detection/coarse time synchronization unit.

Barker detection circuit 305 tells the receiver 300 whether or not there is a packet coming in, acting in part as a "confirming" signal detection unit or second check of signal detection unit 303. If it detects a signal, it passes the complex number representing the signal to AGC unit 306, which adjusts the amplitude of the incoming signal so as to be within an acceptable range for further processing by downstream components of receiver 300. Additionally, Barker detection circuit 305 provides an estimated starting time for the incoming packet. This rough (coarse adjusted) time synchronization is refined in time synchronization portion 310, to attain an exact (fine adjusted) time synchronization for synching the incoming packet with receiver 300.

The fine-adjusted time synchronization is output to desampler 325, which uses the time sync to down-sample the data flow from 8 samples/symbol to one (1) sample/symbol. The output of desampler 325 is fed to equalizer 335, which processes one sample per symbol to combat inter-symbol interference.

Particularly, equalizer 335 is necessary for handling channels that exhibit delay spread effects (i.e., channels other than the channel 1 model discussed above). Equalizer 335 receives several of the 1-sample/symbols (samples) from desampler 325 and applies weighting factors to each of the samples before combing them into a single output. For example, if a series of received samples from desampler 325 is s1, s2 and s3, etc., equalizer 335 applies weighting factors w1, w2 and w3 so that it outputs a sample $S_{comb}=s1*w1+s2*w2+s3*w3$. The output of equalizer 335 is a complex data stream which is input to HDD 345, which maps each incoming complex number to the closest QPSK symbol on the complex number plane, and outputs the symbol to a DEMAP unit 350 for demodulation and subsequent digital processing as MAC data, in MAC 262 of digital board 261 of WM 270 shown in FIG. 4, for example.

In another branch of receiver 300, FCU 330 adjusts the receiver's oscillator (not shown) to minimize the frequency offset between the receiver and the transmitter's oscillator (of an AP for example). As previously discussed, this frequency offset causes a constant phase drift between two symbols, which can result in significant performance degradation. FCU 330 receives inputs from frequency synchronization unit 315 and AFOC unit 340, and then calculates the per-symbol phase drift, "pd", which is initially set to equal to the output of frequency synchronizing unit 315.

Time samples output from desampler 325 are rotated based on the a phase drift value, more particularly on a per-symbol phase drift value. For instance, if the symbols output and rotated from desampler 325 are s1, s2, s3, etc., and the per-symbol phase drift is +x degrees, s1, s2 and s3 will be rotated by +x, +2x, +3x degrees, etc., respectively on the complex number plane. Although each symbol is rotated by a different angle, the phase drift between two adjacent symbols (which is the definition of per-symbol phase drift) is always x. Moreover, the per-symbol phase drift value may change as the input from the AFOC unit 340 changes, which is discussed in more detail below.

AFOC unit 340 compares the phases between the outputs of both equalizer 325 and hard decision device 345 for each symbol in a transmitted packet. Particularly, a modified stage 2 algorithm is performed in AFOC 340. The modified stage 2 algorithm is comprised of three parts. In the first part, the frequency increment (FI) is raised over that used in the current stage 2 algorithm to combat the larger frequency errors ($\geq 0.6°$); and two different FI values are used. Since the beginning symbols (i.e., the first 50 time symbols) of an incoming packet of information has much larger frequency errors an FI of 0.2 degree/symbol is applied for the first 50 symbols going into HDD. The frequency error is reduced as more and more symbols are processed, thus, for the remainder of the symbols in the packet, a second F1 value of 0.1 degree per symbol is applied.

Similar to the current stage 2 algorithm, the modified stage 2 algorithm also has a count parameter CT with a threshold of 4. This first counter CT1 is dependent on the compared phases of the equalizer 335 and HDD 345 outputs. CT1 will increment +1 or decrement −1, depending on the compared values of the two phases of a single symbol that is output from both the equalizer 335 and HDD 345.

Unlike the current stage 2 frequency correction algorithm, however; the modified stage 2 algorithm in accordance with the present application has a second counter CT2. CT2 is an incremental counter that increments a count for each symbol of the packet (i.e., the phases of a particular time symbol output from equalizer 335 and HDD 345 are not taken into account in CT2). Additionally, CT2 resets at the same time as CT1. The primary difference between CT1 and CT2 is that CT2 doesn't decrement; it only increments at each symbol time. Further, the actual frequency correction amount applied when the first counter CT1=|±4| is a multiplication of FI (0.2 or 0.1 degree/symbol, depending on what symbol is being analyzed) and a weighting factor. The weighting factor is equal to the ratio of the first counter CT1 value to the second counter CT2 value, or CT1/CT2. Thus, actual frequency corrections may be anywhere from 0 to FI.

For example, if CT2 is large (which would be after at least processing of the first 50 symbols), it takes a longer time for CT1 to reach the threshold, implying that the frequency error is not very large. Placing CT2 in the denominator of the weighting factor makes the frequency correction amount smaller, to be consistent with the correspondingly smaller amount of frequency error present after the first 50 symbols of the incoming packet.

Table 1 illustrates an exemplary simulation of how the modified stage 2 algorithm would process a packet of transmitted information. Initially, all parameters are initialized, CT1=CT2=0. In Table 1, the output of equalizer 335 =x, where x is a complex number representing the phase of a symbol output at equalizer 335. The output of HDD 345 is y, where y is also a complex number representing the phase of the same symbol, but output from HDD 345. As previously discussed, frequency errors are much larger for the beginning part of the packet that i.e., the first 50 symbols. Thus, a frequency FI of 0.2° per symbol is applied. After the first 50 symbols, an FI of 0.1°/symbol is applied.

TABLE 1

| Symbol (n) | AFOC Comparison | CT1 | CT2 |
|---|---|---|---|
| 1 | x < y | +1 | 1 |
| 2 | x < y | +2 | 2 |
| 3 | x < y | +3 | 3 |
| 4 | x < y | +4 | 4 |
| 5 | x < y | +1 | 1 |
| 6 | x < y | +2 | 2 |
| 7 | x > y | +1 | 3 |
| 8 | x < y | +2 | 4 |
| 9 | x > y | +1 | 5 |
| 10 | x > y | 0 | 6 |
| 11 | x > y | −1 | 7 |
| 12 | x > y | −2 | 8 |
| 13 | x > y | −3 | 9 |
| 14 | x > y | −4 | 10 |
| 15 | x < y | +1 | 1 |
| . | . | . | . |
| 1300 | x > y | −3 | 20 |
| 1301 | x < y | −2 | 21 |
| 1302 | x > y | −3 | 22 |
| 1303 | x < y | −2 | 23 |
| 1304 | x > y | −3 | 24 |
| 1305 | x < y | −2 | 25 |
| 1306 | x > y | −3 | 26 |
| 1307 | x > y | −4 | 27 |
| 1308 | x > y | −1 | 1 |

Referring to Table 1, the first 15 symbols of a transmitted packet are illustrated, as well as symbols 1300–1308 of a typical 2,000 symbol packet, although the packet may be of variable lengths of symbols. Since the beginning of an incoming packet generally exhibits large frequency errors, CT1 will initially reach its threshold of |±4| rather quickly. Thus, the phases x and y are compared to one another and it can be seen from Table 1 that C1 reaches for an absolute value of 4 at time symbol 4. Accordingly, the FI input to FCU 330 is defined by:

$$FI = FI_A(CT1/CT2);$$

Where $FI_A = 0.2°$ for the first 50 symbols.

Accordingly, the FI input to FCU 330 at symbol 4 is 0.2*(4/4) or +0.2°, since here the phase of the symbol output from equalizer 325 lags that of the same symbol output from HDD 345. At this point, CT1 and to zero for the next iteration of symbol comparison at AFOC 340. As more and more symbols are processed, the frequency error is generally smaller, so the weighted FI fed back to FCU 330 from AFOC 340 will be correspondingly smaller, as is event at symbol 1307 for example, where FI=0.1(4/27) or 0.0148 degrees. This is to be expected, since there is very little frequency error after this many symbols have been processed, evident by the size of CT2 (i.e., at symbols 1300–1306, it can be seen that CT2 has been continually incrementing since no CT1 threshold has been reached).

Figure 6:
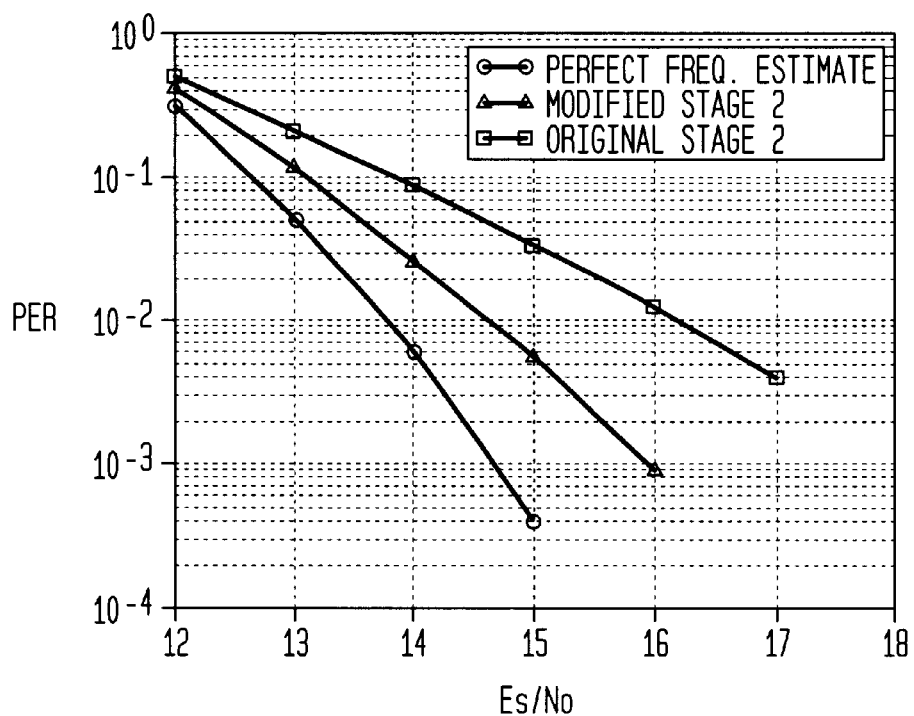
FIG. 6 illustrates packet error rate (PER) performance for the channel impulse response of channel 1 of a wireless modem.
Figure 7:
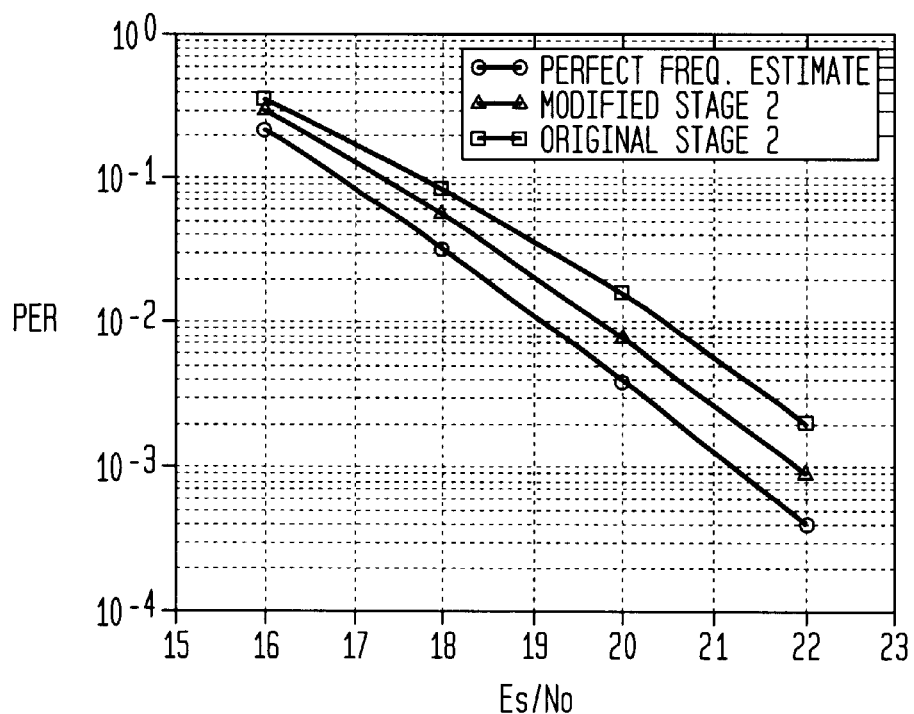
FIG. 7 illustrates PER performance for the response of channel 5.

FIGS. 6 and 7 illustrate the packet error rate (PER) performance for channel models 1 and 5. In each simulation, a fixed output from Barker checking circuit 305 was assumed. Modem crystals were set to be randomly distributed between plus and minus 10 ppm. In the simulation, a coherent demodulated wireless communication system that tends to suffer the most from frequency estimation errors was considered. For each channel, a PDFE [Predictive Decision Feedback Equalizer, a non-linear equalizer such as that illustrated in FIG. 5] was utilized for the simulation.

FIG. 6 illustrates a comparison of the PER performance between the current (original) stage 2 algorithm and the stage 2 algorithm of the present application, versus a perfect frequency estimate for channel 1. The channel impulse response for channel 1, h(z), equals 1. FIG. 6 illustrates a graph of PER (y-axis) versus signal-to-noise ratio (Es/No, x-axis). The response for the perfect frequency estimate is annotated by a circle "○"; the response for the current stage 2 algorithm is annotated by a square "□", and a response for the stage 2 algorithm in accordance with the present application is annotated by a triangle "Δ". In particular, FIG. 6 illustrates the difference in degradation between the various algorithms. As can be seen from FIG. 6, the degradation from the perfect estimation to the original stage 2 algorithm is about 2.4 dB at 1% PER. However, the stage 2 algorithm in accordance with the present application reduces the degradation from the perfect frequency estimation to about 0.9 dB at 1% PER.

FIG. 7 illustrates packet error rate performance for channel 5, which has a channel impulse response of $h(z)=0.86e^{-2.34j}+0.45e^{-2.62j}z^{-1}+0.24e^{+1.03j}z^{-2}$. This response is a channel 5 model with a three-ray delay spread, since h(z) has three terms in the equation. Referring to FIG. 7, the degradation from the perfect frequency estimation to the original stage 2 algorithm is about 1.5 dB, while the degradation between the perfect frequency estimation and the stage 2 algorithm in accordance with the present application has a degradation of only about 0.7 dB (when viewed at 1% PER).

Therefore, the present invention provides a method for correcting frequency errors in a receiver of a coherent demodulated wireless communication system, whereby the frequency increments or corrections applied to combat frequency errors are variable based on a relation between two counters used to count symbols of a transmitted packet. Specifically, with the use of the stage 2 algorithm in accordance with the present application degradation performance, over that achievable with the current stage 2 algorithm, is improved in terms of being able to handle larger frequency errors which are generally present at the beginning of an incoming packet of transmitted information. Further, the method of the present application adjusts the frequency increment fed back to FCU 330 based on the number of time symbols already processed, and the relation between the counts in counters CT1 and CT2.

The invention being thus described, it will be obvious that the same may be varied in many ways. For example, although the method had been described using a receiver of a WM, any receiver of a coherently demodulated wireless communication network and/or system may employ the modified stage 2 algorithm. Additionally, although the above-described receiver has been described as comprised of several components or blocks, it should be understood that the stage 2 algorithm can be implemented in applications specific to integrated circuits, software-driven processor circuitry, or other arrangements of discrete components. Further, the modified stage 2 algorithm is not limited to coherently demodulated wireless systems; it is applicable to any communication systems (wireless or non-wireless, such as a computer modem) which utilizes coherent demodulation. Such variations are not to be regarded as a departure from the spirit and scope of the invention, and all such modifications as would be obvious to one skilled in the art are intended to be included within the scope of the following claims.

What is claimed is:

1. A method of correcting frequency errors in a receiver of a wireless communication network, comprising:

performing a first count for a plurality of symbols of a transmitted packet up to a threshold;

performing a second count of said plurality of symbols; and applying a frequency correction to the receiver when said first count reaches said threshold.

2. The method of claim 1, wherein said second count is performed simultaneously with said first count.

3. The method of claim 1, wherein said applied frequency correction is greater for symbols at the beginning of the transmitted packet than for symbols in the remainder of said packet.

4. The method of claim 1, wherein said applied frequency correction is a frequency increment (FI) defined by:

$$FI = FI_A * CT1/CT2;$$

wherein $FI_A$ is a variable frequency increment, CT1 is the count value of said first count, and CT2 is the count value of said second count, and wherein FI is applied when CT1 reaches said threshold.

5. The method of claim 4, wherein said threshold is reached when CT1=|±4|.

6. The method of claim 4, wherein $FI_A$=0.2 degrees/symbol for the first 50 symbols of said transmitted packet processed by said receiver and 0.1 degrees/symbol for the remaining symbols of said transmitted packet.

7. The method of claim 1, further comprising resetting said first and second counts to zero when said first count reaches said threshold.

8. The method of claim 1, further comprising comparing phases for each symbol from the outputs of two distinct receiver components to determine whether to increment or decrement said first count.

9. The method of claim 8, wherein said second count increments for each symbol in the transmitted packet until the entire packet has been processed by the receiver, and wherein said second count resets when said first count reaches said threshold.

10. A receiver for use in a wireless communication system, comprising:

a frequency offset correction unit for applying frequency corrections to compensate for frequency errors generated by a transmitted packet of information received by the receiver, wherein said frequency offset correction unit is configured to perform a first count for a plurality of symbols of said transmitted packet until reaching a threshold, and to perform a second count for said plurality of symbols, and wherein said frequency offset correction unit applies a frequency correction to the receiver if said first count reaches said threshold.

11. The receiver of claim 10, wherein said first and second counts are simultaneously performed for each of said plurality of symbols in a transmitted packet.

12. The receiver of claim 10, wherein said applied frequency correction is greater for symbols at the beginning of the transmitted packet than for symbols in the remainder of said packet.

13. The receiver of claim 10, wherein said frequency correction applied by said frequency offset correction unit is a frequency increment (FI) defined by:

$$FI = FI_A * CT1/CT2;$$

wherein $FI_A$ is a variable frequency increment, CT1 is the count value of said first count, and CT2 is the count value of said second count, and wherein FI is applied when CT1 reaches said threshold.

14. The receiver of claim 13, wherein said threshold is reached when CT1=|±4|.

15. The receiver of claim 13, wherein $FI_A$=0.2 degrees/symbol for the first 50 symbols of said transmitted packet processed by said receiver and 0.1 degrees/symbol for the remaining symbols of said transmitted packet.

16. The receiver of claim 10, wherein said frequency offset correction unit resets said first and second counts to zero when said first count reaches said threshold.

17. The receiver of claim 10, further comprising:

an equalizer for handling inter-symbol interference generated between symbols in said packet, wherein said equalizer outputs a complex number representing a phase of each symbol; and a decision device which maps the complex number received from the equalizer to a closest QPSK number of the complex plane and outputs said closest QPSK number, wherein said frequency offset correction unit compares phases for each symbol from the outputs of said equalizer and decision device to determine whether to increment or decrement said first count.

18. The receiver of claim 17, wherein said second count increments for each symbol in the transmitted packet until said first count reaches said threshold.

19. A method of correcting frequency errors in a receiver of a wireless communication network, comprising:

performing a first count and a second count for a plurality of symbols of a transmitted packet; and applying a frequency correction to the receiver if said first count reaches a threshold, the applied frequency correction being greater for symbols at the beginning of the transmitted packet than for symbols in the remainder of the transmitted packet.

20. A method of correcting frequency errors in a receiver of a wireless communication network, the receiver including a plurality of receiver components, comprising:

performing a first count and a second count for a plurality of symbols of a transmitted packet; and comparing phases for each symbol from outputs of two distinct receiver components to determine whether to increment or decrement the first count.

* * * * *